(12) United States Patent
Kang et al.

(10) Patent No.: US 12,186,721 B2
(45) Date of Patent: Jan. 7, 2025

(54) AEROGEL BLANKET AND METHOD FOR MANUFACTURING SAME

(71) Applicant: LG CHEM, LTD., Seoul (KR)

(72) Inventors: Tae Gyeong Kang, Daejeon (KR); Se Won Baek, Daejeon (KR); Bong June Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 150 days.

(21) Appl. No.: 17/429,116

(22) PCT Filed: Sep. 3, 2020

(86) PCT No.: PCT/KR2020/011808
§ 371 (c)(1),
(2) Date: Aug. 6, 2021

(87) PCT Pub. No.: WO2021/045514
PCT Pub. Date: Mar. 11, 2021

(65) Prior Publication Data
US 2022/0080377 A1    Mar. 17, 2022

(30) Foreign Application Priority Data

Sep. 3, 2019 (KR) .................. 10-2019-0109158
Sep. 30, 2019 (KR) .................. 10-2019-0121147

(51) Int. Cl.
*B01J 13/00* (2006.01)
*B01J 3/00* (2006.01)
(Continued)

(52) U.S. Cl.
CPC .......... *B01J 13/0091* (2013.01); *B01J 3/008* (2013.01); *C01B 33/155* (2013.01);
(Continued)

(58) Field of Classification Search
CPC ..... B01J 3/008; B01J 13/0091; C01B 33/155; C01B 33/1585; C01B 33/159;
(Continued)

(56) References Cited

U.S. PATENT DOCUMENTS 1,131,270 A   3/1915  Quick
5,789,075 A   8/1998  Frank et al.
(Continued)

FOREIGN PATENT DOCUMENTS

CN   101137587       3/2008
CN   101698583 A     4/2010
(Continued)

OTHER PUBLICATIONS

Machine translation of WO-2017145359-A1 (Year: 2017).*
(Continued)

*Primary Examiner* — Colin W. Slifka
*Assistant Examiner* — Logan Edward Laclair
(74) *Attorney, Agent, or Firm* — BRYAN CAVE LEIGHTON PAISNER LLP

(57) ABSTRACT

Provided is a method for manufacturing an aerogel blanket, and an aerogel blanket having uniform thermal conductivity inside a substrate, wherein the method is capable of simplifying manufacturing equipment by performing gelation while rotating a substrate for a blanket into which a catalyzed sol is impregnated, improving manufacturing efficiency by controlling manufacturing time regardless of the thickness of the aerogel blanket, and improving thermal conductivity by uniformly forming aerogel in the substrate for a blanket.

4 Claims, 1 Drawing Sheet

(51) Int. Cl.
*C01B 33/155* (2006.01)
*C01B 33/158* (2006.01)
*C01B 33/159* (2006.01)

(52) U.S. Cl.
CPC ........ *C01B 33/1585* (2013.01); *C01B 33/159* (2013.01); *C01P 2006/32* (2013.01)

(58) Field of Classification Search
CPC . C01B 33/145; C01B 33/158; C01P 2006/32; C04B 14/064; C04B 30/02; C04B 2201/32; Y02A 20/124; Y02E 60/13
See application file for complete search history.

(56) References Cited

U.S. PATENT DOCUMENTS

| | | | |
|---|---|---|---|
| 5,830,387 | A | 11/1998 | Yokogawa et al. |
| 6,068,882 | A | 5/2000 | Ryu |
| 6,364,953 | B1 | 4/2002 | Kawakami et al. |
| 6,799,442 | B1 | 10/2004 | Costa et al. |
| 11,059,262 | B2 | 7/2021 | Oh et al. |
| 2001/0034375 | A1 | 10/2001 | Schwertfeger et al. |
| 2005/0046086 | A1 | 3/2005 | Lee et al. |
| 2005/0167891 | A1 | 8/2005 | Lee et al. |
| 2008/0093016 | A1 | 4/2008 | Lee et al. |
| 2009/0123358 | A1 | 5/2009 | Costa et al. |
| 2012/0025127 | A1 | 2/2012 | Yeo et al. |
| 2016/0096949 | A1 | 4/2016 | Evans et al. |
| 2018/0009969 | A1 | 1/2018 | Kim et al. |
| 2018/0029892 | A1 | 2/2018 | Yu et al. |
| 2018/0072578 | A1 | 3/2018 | Kim et al. |
| 2018/0094114 | A1 | 4/2018 | Evans et al. |
| 2018/0112057 | A1 | 4/2018 | Evans et al. |
| 2018/0112058 | A1 | 4/2018 | Evans et al. |
| 2018/0134867 | A1 | 5/2018 | Evans et al. |
| 2018/0147811 | A1 | 5/2018 | Oh et al. |
| 2018/0148888 | A1 | 5/2018 | Kim et al. |
| 2018/0179073 | A1 | 6/2018 | Oh et al. |
| 2018/0179074 | A1 | 6/2018 | Kim et al. |
| 2018/0179075 | A1 | 6/2018 | Kim et al. |
| 2018/0244029 | A1 | 8/2018 | Kim et al. |
| 2018/0264793 | A1 | 9/2018 | Kim et al. |
| 2018/0326700 | A1 | 11/2018 | Kim |
| 2018/0354805 | A1 | 12/2018 | Kim et al. |
| 2019/0002356 | A1 | 1/2019 | Hebalkar |
| 2019/0062167 | A1 | 2/2019 | Kim et al. |
| 2019/0119494 | A1 | 4/2019 | Makino et al. |
| 2019/0203014 | A1 | 7/2019 | Evans et al. |
| 2019/0276322 | A1 | 9/2019 | Kim et al. |
| 2020/0025324 | A1 | 1/2020 | Izumi et al. |
| 2020/0048100 | A1 | 2/2020 | Yu et al. |
| 2020/0215791 | A1 | 7/2020 | Oh et al. |
| 2020/0216322 | A1 | 7/2020 | Min et al. |
| 2020/0224005 | A1 | 7/2020 | Kim et al. |
| 2020/0255295 | A1 | 8/2020 | Kim et al. |
| 2020/0308011 | A1 | 10/2020 | Kim et al. |
| 2021/0114887 | A1 | 4/2021 | Oh et al. |
| 2021/0155486 | A1 | 5/2021 | Kang et al. |
| 2021/0198112 | A1 | 7/2021 | Oh et al. |
| 2022/0048778 | A1 | 2/2022 | Kim et al. |
| 2022/0204350 | A1 | 6/2022 | Oh et al. |

FOREIGN PATENT DOCUMENTS

| | | |
|---|---|---|
| CN | 103910516 | 7/2014 |
| CN | 104164758 A | 11/2014 |
| CN | 105597635 | 5/2016 |
| CN | 105664809 | 6/2016 |
| CN | 106630930 A | 5/2017 |
| CN | 106794996 | 5/2017 |
| CN | 107034678 A | 8/2017 |
| CN | 107129262 | 9/2017 |
| CN | 107406327 A | 11/2017 |
| CN | 107523275 | 12/2017 |
| CN | 107531495 A | 1/2018 |
| CN | 107709013 A | 2/2018 |
| CN | 107735362 | 2/2018 |
| CN | 107735385 | 2/2018 |
| CN | 107848815 A | 3/2018 |
| CN | 207310663 U | 5/2018 |
| CN | 108136749 A | 6/2018 |
| CN | 108383129 | 8/2018 |
| CN | 108585762 | 9/2018 |
| CN | 108658572 A | 10/2018 |
| CN | 108689678 A | 10/2018 |
| CN | 108821741 | 11/2018 |
| CN | 109415214 A | 3/2019 |
| CN | 109437832 | 3/2019 |
| CN | 109868598 A | 6/2019 |
| CN | 110615663 | 12/2019 |
| CN | 111925186 A | 11/2020 |
| EP | 3284720 A1 | 2/2018 |
| EP | 3375757 A1 | 9/2018 |
| EP | 3453676 A1 | 3/2019 |
| EP | 3569304 A1 | 11/2019 |
| EP | 3778483 A1 | 2/2021 |
| EP | 3878812 A1 | 9/2021 |
| EP | 3901093 A1 | 10/2021 |
| EP | 3901094 A1 | 10/2021 |
| JP | 2001-007100 | 1/2001 |
| JP | 2001-072408 | 3/2001 |
| JP | 2003-513873 A | 4/2003 |
| JP | 4115088 | 7/2008 |
| JP | 2008-532898 | 8/2008 |
| JP | 2011-190136 | 9/2011 |
| JP | 2012-144428 | 8/2012 |
| JP | 2014-173222 | 9/2014 |
| JP | 2017-533163 | 11/2017 |
| JP | WO2017-010551 | 2/2018 |
| JP | 2018-523022 | 8/2018 |
| JP | 2018-532682 | 11/2018 |
| JP | 2018-535178 | 11/2018 |
| JP | 2018-204725 | 12/2018 |
| JP | 2018-537311 | 12/2018 |
| JP | 2018-537383 | 12/2018 |
| JP | 2018-538224 | 12/2018 |
| JP | 2021-523869 | 9/2021 |
| KR | 10-2001-0104372 | 11/2001 |
| KR | 10-0372823 | 2/2003 |
| KR | 10-0385829 | 10/2003 |
| KR | 10-0710887 | 4/2007 |
| KR | 10-2007-0114668 | 12/2007 |
| KR | 10-0831877 | 5/2008 |
| KR | 10-2010-0053350 | 5/2010 |
| KR | 10-2010-0133268 | 12/2010 |
| KR | 10-2011-0067163 | 6/2011 |
| KR | 10-2011-0082379 | 7/2011 |
| KR | 10-2011-0126381 | 11/2011 |
| KR | 10-2012-0012836 | 2/2012 |
| KR | 10-1147494 | 5/2012 |
| KR | 10-2012-0070948 | 7/2012 |
| KR | 10-1176137 | 8/2012 |
| KR | 10-2014-0120721 | 10/2014 |
| KR | 10-1498562 | 3/2015 |
| KR | 10-2016-0101330 | 8/2016 |
| KR | 10-2017-0031011 A | 3/2017 |
| KR | 10-2017-0063800 | 6/2017 |
| KR | 10-2017-0086831 | 7/2017 |
| KR | 10-2017-0096513 | 8/2017 |
| KR | 10-2017-0096514 | 8/2017 |
| KR | 10-2017-0098003 | 8/2017 |
| KR | 10-2017-0098592 | 8/2017 |
| KR | 10-2017-0112985 | 10/2017 |
| KR | 10-2018-0029235 | 3/2018 |
| KR | 10-2018-0033064 | 4/2018 |
| KR | 10-2018-0132723 A | 12/2018 |
| KR | 10-2019-0008007 | 1/2019 |
| KR | 10-1953349 | 2/2019 |
| KR | 10-2019-0021956 | 3/2019 |
| KR | 10-1953347 | 5/2019 |
| KR | 10-2019-0063799 | 6/2019 |
| KR | 10-2019-0065325 | 6/2019 |
| KR | 10-2019-0078765 | 7/2019 |
| KR | 10-2019-0098728 | 8/2019 |

(56) References Cited

FOREIGN PATENT DOCUMENTS

| KR | 10-2023531 | 9/2019 |
|---|---|---|
| KR | 10-2020-0063084 | 6/2020 |
| WO | 2016-054524 A2 | 4/2016 |
| WO | WO-2017145359 A1 * | 8/2017 |
| WO | 2017-171217 | 10/2017 |
| WO | 2018/208005 A1 | 11/2018 |
| WO | 2019-039841 | 2/2019 |
| WO | 2019-098519 | 5/2019 |
| WO | 2019-107706 | 6/2019 |
| WO | 2021-045483 | 3/2021 |

OTHER PUBLICATIONS

Yokogawa et al (Hydrophobic silica aerogels , Non-Crystalline Solids, 1995) (Year: 1995).*
Lee et al (Super-insulating, flame-retardant, and flexible poly(dimethylsiloxane) composites based on silica aerogel, Composites Part A, May 2019) (Year: 2019).*
Office Action of Japanese Patent Office in Appl'n No. 2021-537114, dated Jun. 28, 2022.
Office Action of Japanese Patent Office in Appl'n No. 2021-543412, dated Jul. 26, 2022.
Office Action of Chinese Patent Office in Appl'n No. 202080007437.1, dated Aug. 3, 2022.
Ma et al., "Preparation and Low-temparature Properties of Fiber Reinforced $SiO_2$ Aerogel Composites," Materials Review 29(10):43-46, 63 (2015), [English Language Abstract included].
Zhang et al., "Hygrothermal performance of silica aerogel composite for thermal insulation material," New Building Materials 3:67-71 (2017), [English Language Abstract included].
Extended Search Report of European Patent Office in Appl'n No. 20859770.8, dated Sep. 30 2022.
Extended Search Report of European Patent Office in Appl'n No. 20860200.3, dated Sep. 27, 2022.
Aspen Aerogels Inc., AR5100, Vibration Testing Report, 1 page (2003).
Rao et al., "Synthesis and Characterization of Hydrophobic TMES/TEOS Based Silica Aerogels," Journal of Porous Materials 10:23-29 (2003).
Office of the U.S. Patent Office in U.S. Appl. No. 17/425,906, dated Apr. 12, 2023.
Office Action of the U.S. Patent Office in U.S. Appl. No. 17/621,830, dated May 23, 2023.
Office Action of Chinese Patent Office in Appl'n No. 202080007437.1, dated Mar. 16, 2022.
Office Action of Japanese Patent Office in Appl'n No. 2021-507638, dated Apr. 5, 2022.
Office Action of Chinese Patent Office in Appl'n No. 202080037036.0, dated Apr. 22, 2022.
Office Action of Chinese Patent Office in Appl'n No. 202080006923.1, dated Apr. 22, 2022.
Office Action of Chinese Patent Office in Appl'n No. 202080012559.X, dated May 7, 2022.
Office Action of Chinese Patent Office in Appl'n No. 202080045596.0, dated May 11, 2022.
Office Action of Chinese Patent Office in Appl'n No. 202080012733.0, dated May 18, 2022.
Final Office Action issued for U.S. Appl. No. 17/425,906 dated Sep. 11, 2023.
Final Office Action issued for U.S. Appl. No. 17/429,116 dated Nov. 2, 2023.
U.S. Appl. No. 17/425,906.
U.S. Appl. No. 17/416,619.
Subramaniam Iswar et al., "Effect of aging on silica aerogel properties", Microporous and Mesoporous Materials, vol. 241, Mar. 15, 2017, pp. 293-302.

* cited by examiner

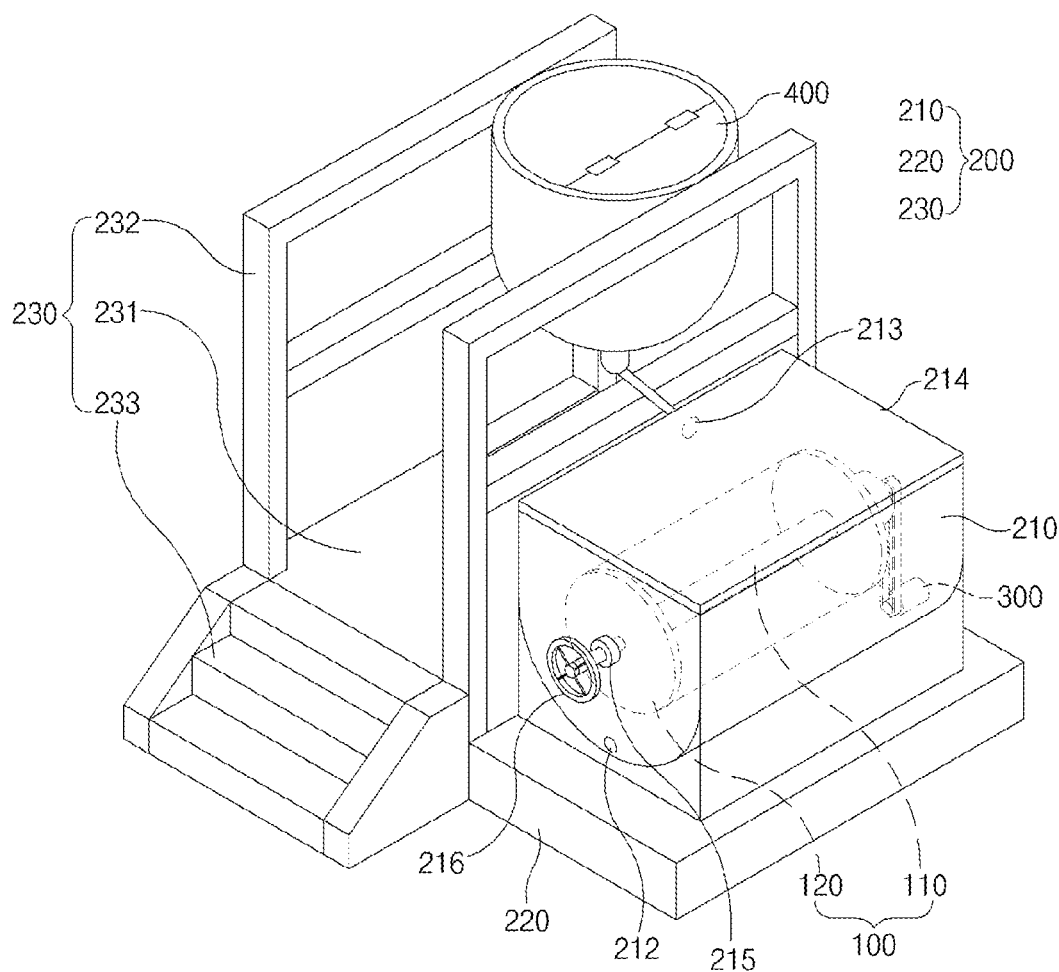

AEROGEL BLANKET AND METHOD FOR MANUFACTURING SAME

CROSS-REFERENCE TO RELATED APPLICATIONS

This application is a National Stage Application of International Application No. PCT/KR2020/011808 filed on Sep. 3, 2020, which claims priority to and the benefit of Korean Patent Application Nos. 10-2019-0109158, filed on Sep. 3, 2019, and 10-2019-0121147, filed on Sep. 30, 2019, in the Korean Intellectual Property Office, the disclosures of which are incorporated herein in their entirety by reference.

TECHNICAL FIELD

The present invention relates to a method for manufacturing an aerogel blanket including a step of gelation while rotating a substrate for a blanket into which a sol is impregnated and to a high thermal insulation aerogel blanket manufactured by the method.

BACKGROUND

An aerogel is a super-porous, high specific surface area ($\geq 500$ m$^2$/g) material having a porosity of about 90-99.9% and a pore size in the range of 1-100 nm, and is a material having excellent properties of ultra-light weight, super thermal insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for super capacitors, and electrode materials for seawater desalination have been actively conducted.

The biggest advantages of the aerogel are that the aerogel has super-insulation properties exhibiting a thermal conductivity of 0.300 W/m·K or less, which is lower than that of a conventional organic thermal insulation material such as Styrofoam, and that fire vulnerability and the generation of harmful gases in case of occurrence of fire which are fatal weaknesses of the organic thermal insulation material can be solved.

In general, the aerogel is produced by preparing a hydrogel from a precursor material, and removing a liquid component inside the hydrogel without destroying a microstructure. An aerogel can be typically classified into three types, i.e., powder, granule, and monolith, and the silica aerogel is generally produced in the form of powder.

The above powder-type silica aerogel can be made into a composite with fibers and be commercialized in the form of an aerogel blanket or an aerogel sheet. Such an aerogel blanket and an aerogel sheet can be bent, folded, or cut in any size or shape due to the flexibility thereof. Therefore, the powder-type silica aerogel can be applied not only to industrial applications such as thermal insulation panels for LNG carriers, industrial insulation materials, spacesuits, transportation, vehicles, and insulation materials for electric power production, but also to household goods such as jackets and sports shoes. In addition, when an aerogel is used in fire-proof doors as well as roofs and floors in housing such as an apartment, there is a great effect in fire prevention.

Specifically, an aerogel blanket in the present specification is a concept referring to a material in which an aerogel is impregnated on a substrate for a blanket such as a fiber, and a method for manufacturing the aerogel blanket is divided into a gel casting method and a method for preparing aerogel powder or granules and then depositing the same on a substrate for a blanket using a binder.

Products manufactured by the gel casting method account for the majority of the usage to date because of the good physical properties thereof, and currently, a gel casting method using a roll-to-roll technique is known as a commercially available technology. However, in order to manufacture an aerogel blanket by the roll-to-roll technique, a conveyor belt must be included in the equipment to cast a catalyzed sol and the like on a substrate and to ensure complete gelation, and the conveyor belt must be extended until the gelation is completed, so that there is a problem in that the equipment scale becomes massive in a mass production stage. In addition, there is a problem in that as an aerogel blanket to be manufactured becomes longer, so does a conveyor belt, and therefore, gelation time is increased, thereby increasing an overall manufacturing time. In particular, when an aerogel blanket becomes thinner, the length thereof is increased, thereby increasing manufacturing time, so that there is a problem in that the manufacturing time is affected by the thickness and length of the blanket.

Therefore, when it comes to a method for manufacturing an aerogel blanket, there is a need for research on a method for manufacturing an aerogel blanket, the method which is capable of simplifying manufacturing equipment while increasing manufacturing process efficiency, and which can be commercialized in a mass production process since manufacturing time is not greatly affected by the thickness and the length of the aerogel blanket.

PRIOR ART DOCUMENT

Patent Document (Patent Document 1) KR10-2012-0070948A

DISCLOSURE OF THE INVENTION

Technical Problem

In the manufacturing of an aerogel blanket by a gel casting method, an aspect of the present invention provides a method for manufacturing an aerogel blanket, the method is capable of greatly reducing manufacturing time by performing gelation while rotating a substrate for a blanket into which a catalyzed sol is impregnated during a gelation process and simplifying manufacturing equipment by not allowing the thickness and length of the aerogel blanket to affect the manufacturing time.

Another aspect of the present invention provides a method for manufacturing an aerogel blanket, the method is capable of allowing an aerogel to be uniformly formed in a substrate for a blanket by rotating the substrate for a blanket into which a sol is impregnated, thereby further improving the uniformity of the aerogel formed in the substrate for a blanket, and accordingly exhibiting uniform thermal conductivity in the entire aerogel blanket, and improving the thermal conductivity of the aerogel blanket.

Another aspect of the present invention is to provide a high thermal insulation aerogel blanket manufactured by the method for manufacturing an aerogel blanket.

Technical Solution

According to an aspect of the present invention, there is provided a method for manufacturing an aerogel blanket, the method including 1) introducing a catalyzed sol and a substrate for a blanket into a reaction vessel to impregnate the catalyzed sol into the substrate for a blanket, and 2) rotating the substrate for a blanket into which the catalyzed sol is impregnated to perform gelation.

In addition, according to an embodiment of the present invention, the substrate for a blanket is introduced into the reaction vessel in the state of being wound on a bobbin, and the bobbin is rotated to rotate the substrate for a blanket into which the catalyzed sol is impregnated.

According to another embodiment of the present invention, there is provided an aerogel blanket in which the deviation between the highest value of the thermal conductivity of the aerogel blanket and the lowest value of the thermal conductivity thereof is 5.0 mW/m·K or less.

Advantageous Effects

A manufacturing method of the present invention can greatly reduce manufacturing time by performing gelation by rotating a substrate for a blanket into which a catalyzed sol is impregnated, and also simplify manufacturing equipment by not allowing the thickness and length of an aerogel blanket to affect the manufacturing time. Particularly, when the substrate for a blanket is thin and long, the above-described effect of the present invention is further maximized, in which case it is particularly advantageous in greatly increasing productivity.

In addition, since the substrate for a blanket into which the catalyzed sol is impregnated is rotated, an aerogel can be uniformly formed in the substrate for a blanket to further improve the uniformity of the aerogel formed in the substrate for a blanket.

In addition, according to an embodiment of the present invention, since it is possible to perform aging and surface modification in a reaction vessel, and to rotate a gelled wet gel-blanket composite at this time, aging efficiency and surface modification efficiency can be greatly improved.

In addition, an aerogel blanket according to an embodiment of the present invention has uniformly formed aerogel, so that uniform thermal conductivity can be exhibited in the entire aerogel blanket, and the deviation between the highest value of the thermal conductivity of the aerogel blanket and the lowest value of the thermal conductivity thereof is small, so that the overall thermal conductivity of the aerogel blanket can be greatly improved, and thus, the aerogel blanket can be easily used in industrial fields in which high thermal insulation is required.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a perspective view showing an aerogel blanket manufacturing device according to an embodiment of the present invention.

DETAILED DESCRIPTION

Hereinafter, the present invention will be described in more detail to facilitate understanding of the present invention. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor can properly define the meaning of the words or terms to best explain the invention.

1. Method for Manufacturing Aerogel Blanket

A method for manufacturing an aerogel blanket according to an embodiment of the present invention is characterized by including 1) introducing a catalyzed sol and a substrate for a blanket into a reaction vessel to impregnate the catalyzed sol into the substrate for a blanket, and 2) rotating the substrate for a blanket into which the catalyzed sol is impregnated to perform gelation.

Hereinafter, each step of the method for manufacturing an aerogel blanket of the present invention will be described in detail.

Step 1

Step 1) according to an embodiment of the present invention is a step of preparation for forming an aerogel blanket, which is to impregnate a catalyzed sol into a substrate for a blanket, wherein a catalyzed sol can be prepared and then the prepared catalyzed sol and a substrate for a blanket can be introduced into a reaction vessel to impregnate the catalyzed sol into the substrate for a blanket.

The term "impregnation" used in the present invention can be achieved by introducing a catalyzed sol having fluidity to a substrate for a blanket, and can indicate that the catalyzed sol is penetrated into pores inside the substrate for a blanket.

In addition, in Step 1) according to an embodiment of the present invention, as long as a substrate for a blanket and a catalyzed sol are introduced in a reaction vessel, the introduction order thereof is not particularly limited. Specifically, in Step 1), the introduction can be performed by any one method selected from among a method for introducing a substrate for a blanket into a reaction vessel and then introducing a catalyzed sol, a method for introducing a catalyzed sol into a reaction vessel and then introducing a substrate for a blanket, and a method for introducing a substrate for a blanket while introducing a catalyzed sol into a reaction vessel. Among the above, in terms of achieving more uniform impregnation, the method for introducing a substrate for a blanket and then introducing a catalyzed sol can be more desirable. Specifically, when a substrate for a blanket is first introduced, the substrate for a blanket can be rotated when a catalyzed sol is introduced, so that more uniform impregnation can be induced.

According to an embodiment of the present invention, in Step 1), the impregnation can be performed while rotating the substrate for a blanket as described above. When impregnation is performed while rotating a substrate for a blanket, a catalyzed sol can uniformly come into contact with all surfaces of the substrate for a blanket to induce uniform impregnation, which is more desirable.

In the present invention, the catalyzed sol can be prepared by mixing a sol and a base catalyst, wherein the base catalyst serves to promote gelation in Step 2) by increasing the pH of the sol.

At this time, the sol is not limited as long as it is a material capable of forming a porous gel by a sol-gel reaction, and specifically, can include an inorganic sol, an organic sol, or a combination thereof. The inorganic sol can include zirconia, yttrium oxide, hafnia, alumina, titania, ceria, silica, magnesium oxide, calcium oxide, fluorinated magnesium, fluorinated calcium, and combinations thereof, and the organic sol can be polyacrylate, polyolefin, polystyrene, polyacrylonitrile, polyurethane, polyimide, polyfurfural alcohol, phenol furfuryl alcohol, melamine formaldehyde, resorcinol formaldehyde, cresol formaldehyde, phenol formaldehyde, polyvinyl alcohol dialdehyde, polycyanurate, polyacrylamide, various epoxies, agar, agarose, and combinations thereof. In addition, in terms of securing excellent miscibility with a substrate for a blanket, further improving porosity when being formed as a gel, and manufacturing an aerogel blanket having low thermal conductivity, the sol can be preferably a silica sol.

The sol according to an embodiment of the present invention contains a sol precursor, water, and an organic solvent, and can be prepared by mixing a sol precursor, water, and an organic solvent. When the catalyzed sol according to an embodiment of the present invention is a catalyzed silica sol, in Step 1), the catalyzed silica sol can be prepared by mixing a silica sol and a base catalyst, wherein the silica sol can be prepared by mixing a silica precursor, water, and an organic solvent. In addition, the silica sol can undergo hydrolysis at a low pH to facilitate gelation, and at this time, an acid catalyst can be used to lower a pH.

A silica precursor which can be used for preparing the silica sol can be an alkoxide-based compound containing silicon, specifically, tetraalkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among the above, the silica precursor according to an embodiment of the present invention can more specifically be tetraethyl orthosilicate (TEOS).

The silica precursor can be used in an amount which allows the content of silica ($SiO_2$) contained in the silica sol to be 3 wt % to 30 wt %. If the content of the silica is less than 3 wt %, the content of a silica aerogel in a blanket to be finally produced is too low to achieve a desired level of thermal insulation effect. If the content of the silica is greater than 30 wt %, due to excessive formation of a silica aerogel, the mechanical properties of a blanket, the flexibility thereof in particular, can deteriorate.

In addition, as an organic solvent which can be used for preparing the sol of the present invention, any material can be used without limitation as long as it has compatibility with a sol precursor and water. Specifically, a polar organic solvent can be used, and more specifically, an alcohol can be used. Here, the alcohol can specifically be a monohydric alcohol such as methanol, ethanol, isopropanol, and butanol; or a polyhydric alcohol such as glycerol, ethylene glycol, propylene glycol, diethylene glycol, dipropylene glycol, and sorbitol, and any one thereof or a mixture of two or more thereof can be used. When considering the miscibility with water and an aerogel to be manufactured, the alcohol can be a monohydric alcohol having 1 to 6 carbon atoms such as methanol, ethanol, isopropanol, and butanol.

The organic solvent as described above can be used in an appropriate amount in consideration of the content of an aerogel to be finally prepared.

The silica sol according to an embodiment of the present invention can include a silica precursor and water in a molar ratio of 1:4 to 1:1. In addition, a silica precursor and an organic solvent can be included in a weight ratio of 1:2 to 1:9, and preferably, can be included in a weight ratio of 1:4 to 1:6. When a silica precursor satisfies the above molar ratio or weight ratio with water and an organic solvent, the production yield of aerogel can further increase, so that there is an effect of improving thermal insulation performance.

In addition, as the acid catalyst which can be further included in the sol according to an embodiment of the present invention, any acid catalyst which can allow a pH to be 3 or less can be used without limitation. As an example, hydrochloric acid, nitric acid, or sulfuric acid can be used. At this time, the acid catalyst can be added in an amount which allows the pH of the sol to be 3 or less, and can be added in the form of an aqueous solution dissolved in an aqueous solvent.

Also, a base catalyst which can be used in the catalyzed sol according to an embodiment of the present invention can be an inorganic base such as sodium hydroxide and potassium hydroxide, or an organic base such as ammonium hydroxide. Specifically, the basic catalyst can be one or more selected from the group consisting of sodium hydroxide (NaOH), potassium hydroxide (KOH), calcium hydroxide ($Ca(OH)_2$), ammonia ($NH_3$), ammonium hydroxide ($NH_4OH$; ammonia water), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropyl-amine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, and pyridine, preferably sodium hydroxide, ammonia, ammonium hydroxide or a mixture thereof.

The base catalyst can be included in an amount which allows the pH of the sol to be 7 to 11. If the pH of the sol is out of the above range, the gelation in Step 2) may not be easily achieved, or a gelation rate may be too low, so that processability may be degraded. In addition, since the base can be precipitated when introduced in a solid phase, it can be preferable that the base is added in the form of a solution diluted by an aqueous solvent or the above-described organic solvent. At this time, the dilution ratio of the base catalyst and the organic solvent, specifically an alcohol, can be 1:4 to 1:100 based on volume.

According to an embodiment of the present invention, the catalyzed sol can further be added with an additive if necessary. At this time, as the additive, all known additives which can be added when manufacturing an aerogel can be applied, and for example, an additive such as an opacifying agent, flame retardant, and the like can be used.

The substrate for a blanket can be introduced in an appropriate form which facilitates the introduction according to the shape of a reaction vessel. Specifically, a substrate for a blanket wound on a bobbin in the form of a roll can be introduced into the reaction vessel to facilitate the rotation in Step 2) to be described later. At this time, the bobbin can be a shaft capable of rotating the substrate for a blanket, and anything can be applied without limitation as long as it can wind the substrate for a blanket. As an example, a polygonal cylindrical column, preferably a cylindrical column having a size which can fit inside the reaction vessel can be used. In addition, according to an embodiment of the present invention, the bobbin can include a winding rod capable of winding the substrate for a blanket in the form of a roll, and a support plate which supports a side portion of the substrate for a blanket such that the substrate for a blanket wound on the winding rod is not displaced at the time of rotation. At this time, it is preferable that the winding rod has a number of hollows such that the catalyzed sol can be easily impregnated on the inside of the substrate for a blanket. Meanwhile, in order to allow the catalyzed sol to be introduced into the side portion of the substrate for a blanket, a mesh-type support plate can be used, or the support plate can include a number of hollows. Any material having sufficient strength to support the blanket can be used as the material of the bobbin. Specifically, stainless steel, PE, PP, and Teflon can be used.

The substrate for a blanket can be wound on the bobbin, and the bobbin can be placed into a reaction vessel and fixed. Here, the bobbin can be fixed at any position of the reaction vessel. However, in terms of introducing the substrate for a blanket in a large amount into the reaction vessel of a same volume, thereby increasing production efficiency, the bobbin can preferably be fixed at a central portion of the reaction vessel. In addition, the bobbin can be positioned such that the long axis of the bobbin and the long axis of the reaction vessel are parallel to each other.

Also, the substrate for a blanket according to an embodiment of the present invention can specifically be a porous substrate in terms of improving the thermal insulation properties of an aerogel blanket. When a porous substrate for a blanket is used, a catalyzed sol is allowed to easily penetrate into the substrate, and thus, forms an aerogel uniformly inside the substrate for a blanket, so that an aerogel blanket manufactured can have excellent thermal insulation properties.

The substrate for a blanket which can be used according to an embodiment of the present invention can be a film, a sheet, a net, a fiber, a foam, a non-woven body, or a laminate of two or more layers thereof. Also, according to the use of the substrate for a blanket, surface roughness can be formed or patterned on the surface thereof. More specifically, the substrate for a blanket can be a fiber capable of further improving thermal insulation performance by including a space or a void through which an aerogel can be easily inserted into the substrate for a blanket. Furthermore, the substrate for a blanket can preferably have low thermal conductivity.

Specifically, the substrate for a blanket can be polyamide, polybenzimidazole, polyaramid, an acryl resin, a phenol resin, polyester, polyetheretherketone (PEEK), polyolefin (e.g., polyethylene, polypropylene, a copolymer thereof, or the like), cellulose, carbon, cotton, wool, hemp, a nonwoven fabric, a glass fiber, ceramic wool, or the like. More specifically, the substrate for a blanket in the present invention can be a glass fiber.

According to an embodiment of the present invention, the reaction vessel can be a reaction vessel for performing gelation, and a vessel in any shape such a polygon or a cylinder can be used as long as it is a vessel providing a space in which a substrate for a blanket into which a catalyzed sol is impregnated can rotate therein. However, a cylindrical reaction vessel can be preferably used in terms of facilitating the introduction of a substrate for a blanket wound in the form of a roll and the rotation of the substrate for a blanket into which a catalyzed sol is impregnated during a gelation reaction.

In Step 1) above, when the catalyzed sol is introduced, in order to improve the bonding of the substrate for a blanket and the catalyzed sol, the substrate for a blanket can be lightly pressed down to achieve sufficient impregnation. Thereafter, the substrate for a blanket can be pressed at a constant pressure to a predetermined thickness to remove excess sol, thereby shortening drying time. In another embodiment, when a catalyzed sol is introduced into a reaction vessel, and a substrate for a blanket is sufficiently impregnated so that the liquid level in the reaction vessel no longer changes, a drain valve connected to the reaction vessel can be opened to recover remaining sol.

In addition, the catalyzed sol and the substrate for a blanket can each be introduced in an amount, specifically in an amount of 1 to 100% of the internal volume of the reaction vessel, and in terms of shortening the gelation time in Step 2) and uniformly forming an aerogel inside the substrate for a blanket, can be introduced in an amount of to 60% of the volume of the reaction vessel, more specifically 10 to 60%, even more preferably 30 to 60%, respectively.

According to an embodiment of the present invention, the catalyzed sol can be introduced in an amount of 80 to 120%, preferably 90 to 110%, based on the volume of the substrate for a blanket. In addition, preferably, the introduction amount of the substrate for a blanket and the catalyzed sol can satisfy the above introduction ratio therebetween under the conditions satisfying the introduction amount with respect to the reaction vessel. When a catalyzed sol satisfies the introduction ratio (the introduction amount) with respect to the volume of a substrate for a blanket, the catalyzed sol is more uniformly impregnated on the substrate for a blanket, so that an aerogel blanket to be manufactured can have more uniform physical properties, and since the catalyzed sol can all be impregnated on the substrate for a blanket, it is possible to prevent the loss of raw materials and prevent a problem in which the catalyzed sol is gelled alone.

Step 2)

Step 2) according to an embodiment of the present invention is to manufacture a wet gel-blanket composite (a wet gel blanket), and can be performed by rotating a substrate for a blanket into which a catalyzed sol is impregnated to be gelled.

The rotation of the substrate for a blanket into which a catalyzed sol is impregnated can be performed by any method or device as long as the method allows rotation during gelation in a reaction vessel. Specifically, when a substrate for a blanket is introduced and fixed while being wound on a bobbin in Step 1) above, the substrate for a blanket into which a catalyzed sol is impregnated is present in the reaction vessel while being wound on the bobbin, so that the substrate for a blanket into which a catalyzed sol is impregnated can be rotated by rotating the bobbin.

In the present invention, the gelation can be to form a network structure from a catalyzed sol, wherein the network structure can represent a planar mesh structure in which specific polygons having one or more types of atomic arrangement are linked to each other, or a structure in which specific polyhedrons share their vertices, edges, faces, and the like with each other to form a three-dimensional skeletal structure.

According to an embodiment of the present invention, a gelation reaction can be performed after sealing a reaction vessel into which a catalyzed sol and a substrate for a blanket are introduced. In addition, according to an embodiment of the present invention, rotation can be performed by disposing a long axis in a lateral direction, that is, in a horizontal direction. If the reaction vessel (a main body) is a cylindrical reaction vessel, the cylindrical reaction vessel can be laid down and rotated. That is, the rotating axis of the reaction vessel of the present invention can be horizontal, but is not limited thereto.

According to an embodiment of the present invention, the type of a device for manufacturing an aerogel blanket is not limited as long as it is a device including the reaction vessel (a main body) and capable of rotating the substrate for a blanket into which a catalyzed sol is impregnated present in the reaction vessel. Any device known in the art can be used as long as the device is capable of rotating. Specifically, any known device can be used as long as it is capable of fixing the position of a bobbin in a reaction vessel and rotating the bobbin whose position is fixed. An example of a device for manufacturing an aerogel blanket which can be applied in the present invention will be described later.

In addition, according to an embodiment of the present invention, after Step 1) above is completed, Step 2) above can be initiated to sequentially perform Step 1) above and Step 2) above.

According to another embodiment of the present invention, before Step 1) above is completed, Step 2) above can be initiated. When Step 2) is performed before the completion of Step 1) above as described above, all of the catalyzed sol can be introduced into the reaction vessel until gelation is completed, specifically before the completion of the gelation.

According to an embodiment of the present invention, the rotation rate in Step 2) above can be applied without limitation as long as it is a rotation rate which allows an aerogel to uniformly form in a blanket. As an example, gelation can be performed while performing rotation at a rotation rate of 1 rpm to 300 rpm, preferably 5 rpm to 150 rpm, 5 rpm to 100 rpm, and more preferably 10 rpm to 30 rpm. When the reaction vessel satisfies the rotation rate in the above range, a sol can be evenly impregnated on a substrate for a blanket, so that an aerogel is more uniformly formed during gelation. Accordingly, it is possible to secure very uniform thermal conductivity throughout an aerogel blanket and there is an advantage in that the safety of a process for manufacturing the aerogel blanket is increased by increasing the stability of a reaction vessel and an apparatus for rotating the reaction vessel.

In the present invention, a catalyzed sol and a substrate for a blanket are all put into a reaction vessel to be gelled, thereby manufacturing an aerogel blanket, so that unlike a roll-to-roll method, which has been typically applied, a moving element such as a conveyor belt is not separately required, and thus there is an advantage in that a space to be used during the manufacturing can be greatly reduced. In addition, as in the roll-to-roll method, when a substrate for a blanket is disposed on a moving element and then a catalyzed sol is applied on the substrate for a blanket, followed by continuously moving the moving element to perform gelation, the gelation is not simultaneously performed on the entire substrate for a blanket, but is sequentially performed over time while continuously supplying the substrate for a blanket and the catalyzed sol, so that there is a problem in that even if a substrate for a blanket having the same thickness and length is used, gelation takes much longer than the gelation process according to an embodiment of the present invention. Specifically, the longer the substrate for a blanket, the more noticeable the problem that gelation process time becomes longer in order to achieve sufficient gelation on the entire substrate for a blanket. However, according to an embodiment of the present invention, the gelation of a sol is simultaneously achieved on the entire substrate for a blanket, so that manufacturing time can be significantly reduced. In addition, the length and thickness of a substrate for a blanket do not affect gelation time, so that even if a long substrate for a blanket is used, manufacturing time can be significantly reduced to maximize process efficiency.

In addition, according to an embodiment of the present invention, since gelation is performed while rotating a reaction vessel, centrifugal force and centripetal force are applied. Therefore, compared to a roll-to-roll method in which a reaction vessel is not rotated or gelation is performed on a moving element, an aerogel blanket in which an aerogel is more uniformly dispersed can be manufactured, so that the thickness of the manufactured aerogel blanket is the same or very similar to the thickness of a substrate for a blanket, and there is an effect in that thermal insulation properties are excellent.

In addition, according to an embodiment of the present invention, the rotation in Step 2) above can be performed by having the rotation axis of the substrate for a blanket in a lateral direction. Here, the lateral direction can mean a direction horizontal to the ground. When the rotation is performed having the rotation axis of the substrate for a blanket in a longitudinal direction (a direction perpendicular to the ground) or in a diagonal direction (a direction having a certain angle between a direction horizontal to the ground and a direction perpendicular to the ground), the catalyzed sol or the catalyzed sol impregnated into the substrate for a blanket can be driven in the direction of the ground by gravity. Accordingly, uniform impregnation and gelation can be induced by centrifugal force in the direction perpendicular to the rotation axis of the substrate for a blanket substrate, but non-uniform impregnation and gelation can be induced in the direction horizontal to the rotation axis of the substrate for a blanket substrate. Therefore, in order to induce uniform impregnation and gelation by allowing the catalyzed sol to uniformly come into contact with all surfaces of the substrate for a blanket, that is, in both the direction perpendicular to the rotation axis of the substrate for a blanket and the direction horizontal thereto, it can be preferable that the rotation in Step 2) is performed having the rotation axis of the substrate for a blanket in a lateral direction.

In addition, the manufacturing method according to an embodiment of the present invention can perform an aging step as a process for allowing a chemical change to be completely achieved by leaving the wet gel blanket composite to stand at a suitable temperature. The aging step can more firmly form the formed network structure, and thus, can enhance the mechanical stability of the aerogel blanket of the present invention.

The aging step of the present invention is performed by adding a solution in which a basic catalyst such as sodium hydroxide (NaOH), potassium hydroxide (KOH), ammonium hydroxide ($NH_4OH$), triethylamine, pyridine, and the like is diluted in an organic solvent at a concentration of 1-10%. Therefore, a Si—O—Si bonding in an aerogel is induced to the maximum to allow the network structure of a silica gel to be more firm, so that there is an effect of facilitating the maintenance of the pore structure in a quick drying process to be performed later. At this time, the organic solvent can be the alcohol (a polar organic solvent) described above, and specifically, can include ethanol.

Also, the aging step should be performed in a suitable temperature range to enhance the optimal pore structure. The aging step of the present invention can be performed by leaving the wet gel blanket composite to stand for 1-10 hours at a temperature of 30-70° C. When the aging temperature is below 30° C., aging time becomes excessively long, which can cause the total process time to increase, so that there can be problem in that productivity decreases. When the aging temperature is above 70° C., the temperature is out of the boiling point of ethanol, so that there can be a problem in that the loss of the solvent due to evaporation increases, which can cause raw material cost to increase.

In addition, according to an embodiment of the present invention, a surface modification step can be further performed to manufacture a hydrophobic aerogel blanket.

When a hydrophilic functional group present on the surface of an aerogel is substituted with a hydrophobic functional group, the shrinkage of pores due to the surface tension of a solvent during the drying of the aerogel can be minimized by the repulsive force between hydrophobic functional groups. The dried aerogel maintains low thermal conductivity immediately after being dried. However, since a hydroxy functional group present on the surface of an aerogel, for example, when the aerogel is a silica aerogel, a hydrophilic silanol group (Si—OH) present on the surface of silica absorbs water in the air, there is a disadvantage in that thermal conductivity is gradually increased. Therefore, in order to maintain low thermal conductivity, there is a need to modify the surface of the aerogel to be hydrophobic.

Accordingly, the surface modification according to an embodiment of the present invention can be performed by a surface modifier including a polar solvent and an organosilane compound.

As the polar solvent, methanol, ethanol isopropyl alcohol, or the like can be used, and as the organosilane compound, trimethylchlorosilane (TMCS), hexamethyldisilazane (HMDS), methyltrimethoxysilane, trimethylethoxysilane, ethyltriethoxysilane, phenyltriethoxysilane, or the like can be used. Specifically, hexamethyldisilazane can be used.

In the surface modification, it is preferable that the solvent is preferably mixed at a volume ratio of 1 to 10 with respect to the gel, and the organosilane compound is mixed at a volume ratio of 0.1 to 10 with respect to the gel. When the volume ratio of the organosilane compound is less than 0.1, reaction time becomes too long, which can cause surface modification efficiency to decrease. When the volume ratio of the organosilane compound is greater than 10, there is a problem of cost rise, and an unreacted surface modifier can cause shrinkage during drying.

In addition, according to an embodiment of the present invention, the aging step and the surface modification step can be performed in a separate reaction vessel after recovering a gelled silica wet gel blanket, or can be performed inside a reaction vessel in which gelation has been performed. In terms of the efficiency of a process and the simplification of equipment, the aging and surface modification steps can be preferably performed in the reaction vessel in which gelation has been performed. In addition, when the aging and surface modification steps are performed in the reaction vessel in which gelation has been performed, the wet gel-blanket composite prepared in Step 2) can rotate, and when the aging and surface modification are performed while the wet gel-blanket composite is rotating, an aging solvent and the surface modifier can be penetrated better, and can be dispersed better in the wet gel blanket composite after the penetration. Therefore, there is an advantage in that aging efficiency and surface modification efficiency can be greatly improved.

After performing the above surface modification step, a hydrophobic wet gel blanket composite can be obtained.

In addition, the wet gel blanket composite according to an embodiment of the present invention can be subjected to a drying step to manufacture an aerogel blanket.

Meanwhile, the manufacturing method according to an embodiment of the present invention can further perform a washing step before the drying. The washing is a step for removing impurities (sodium ions, unreacted substances, by-products, and the like) generated during the reaction and residual ammonia, which can generate an ammonium carbonate salt by reacting with $CO_2$ during supercritical drying, and the like in order to obtain a hydrophobic silica aerogel with high purity, and can be performed by a dilution process or an exchange process using a non-polar organic solvent.

The drying step according to an embodiment of the present invention can be performed through a process for removing a solvent while maintaining the pore structure of an aged gel, and the drying step can be performed by a supercritical drying process or an atmospheric drying process.

The supercritical drying process can be performed using supercritical carbon dioxide. Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide becomes to be in a critical state in which gas and liquid cannot be distinguished. Carbon dioxide in a critical state is referred to a supercritical carbon dioxide.

A supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time can be shortened.

Specifically, the supercritical drying process performs a solvent substitution process in which an aged wet gel blanket is placed into a supercritical drying reactor, and then $CO_2$ in a liquid state is filled therein, followed by substituting an alcohol solvent inside the wet gel with $CO_2$. Thereafter, the temperature is raised to 40-70° C. at a predetermined temperature raising rate, specifically, 0.1° C./min to 1° C./min, and the pressure which is greater than a pressure at which carbon dioxide becomes to be a supercritical state, specifically, the pressure of 100 bar to 150 bar is maintained to allow the carbon dioxide to remain in the supercritical state for a predetermined amount of time, specifically for 20 minutes to 1 hour. In general, carbon dioxide becomes to be in a supercritical state at the temperature of 31° C. and at the pressure of 73.8 bar. After carbon dioxide is maintained at a predetermined temperature and a predetermined pressure to remain in a supercritical state for 2 hours to 12 hours, more specifically, 2 hours to 6 hours, the pressure is generally lowered to complete the supercritical drying process to manufacture an aerogel blanket.

Also, the atmospheric drying process can be performed according to a typical method such as hot air drying and IR drying under a temperature of 70-200° C. and an atmospheric pressure (1±0.3 atm).

As a result of the above drying process, a blanket including a porous aerogel having nano-sized pores can be manufactured. Particularly, the silica aerogel according to an embodiment of the present invention has excellent physical properties, low tap density and high porosity in particular, together with a high degree of hydrophobicity, and a silica aerogel-containing blanket including the same has excellent mechanical flexibility together with low thermal conductivity.

In addition, before or after the drying process, a compression process to control the thickness and to make the internal structure and surface shape of a blanket uniform, a molding process to have a suitable shape or morphology according to use, or a lamination process for laminating a separate functional layer can be further performed.

2. Device for Manufacturing Aerogel Blanket

A device for manufacturing an aerogel blanket according to an embodiment of the present invention includes, as shown in FIG. 1, a bobbin 100 on which a blanket is to be wound, a main body 200 provided with a gelation tank 210 receiving the bobbin 100, a driving member 300 which rotates the bobbin 100 received in the gelation tank 210, a catalyzed sol supplying member 400 which injects a catalyzed sol into the gelation tank 210, an aging member (not shown) which injects an aging solution into the gelation tank 210, a surface modifier member (not shown) which injects a surface modifier into the gelation tank 210, and a drying member (not shown) which dries the blanket by raising the temperature of the gelation tank 210.

Here, a blanket can mean a substrate for a blanket before a catalyzed sol is introduced, a substrate for a blanket into which a catalyzed sol is impregnated and/or a wet gel blanket after gelation, and can appropriately be interpreted depending on the state of a substrate for a blanket in each step.

Bobbin

The bobbin 100 is for winding a blanket in a roll-form, and includes a winding rod 110 on which the blanket is wound in a roll form, and a support plate 120 which is coupled to each end of the winding rod 110 and supports a side portion of the blanket wound on the winding rod 110.

The winding rod 110 has a cylindrical shape having a hollow penetrating in the longitudinal direction, and a blanket in a long sheet form is wound in a roll form on the outer circumferential surface thereof.

Meanwhile, the outside of the blanket wound on the winding rod 110 can allow a catalyzed sol to be impregnated thereinto fast, and thus, stably gelled. However, there is a problem in that it takes a long time for the sol to be impregnated into the inside of the blanket. In order to prevent the above, the outer circumferential surface of the winding rod 110 has a plurality of connection holes which are connected to the hollow.

That is, the winding rod 110 has a hollow formed thereinside to allow a catalyzed sol injected into the gelation tank 210 to be introduced, and has a plurality of connection holes to allow the catalyzed sol introduced into the hollow to be discharged to the outside of the winding rod 110, and to be impregnated into the inside of the blanket wound on the winding rod 110. Accordingly, the catalyzed sol is simultaneously impregnated on the outside and inside of the blanket and gelled. As a result, the time required for the gelation of the blanket can be greatly shortened, and as a result, the entire blanket can be uniformly gelled.

Meanwhile, the diameter of the plurality of connection holes is 3-5 mm, and the holes are formed at regular intervals on the outer circumferential surface of the winding rod 110. Accordingly, the catalyzed sol can be uniformly supplied to the entire blanket wound on the outer circumferential surface of the winding rod 110, and accordingly, the entire inside of the blanket can be uniformity gelled.

The support plate 120 is to provide support such that the blanket wound on the winding rod 110 is not irregularly wound, and has a disc shape. The support plate 120 is coupled to each end of the winding rod 110 and supports a side portion of the blanket wound on the winding rod 110.

Meanwhile, the support plate 120 has a fastening groove to which an end of the winding rod 110 is coupled, and has a fastening hole formed on the bottom surface of the fastening groove. That is, the support plate 120 can be coupled to the end of the winding rod 110 through the fastening groove.

Meanwhile, the support plate 120 has a plurality of open holes, and the plurality of open holes can allow the catalyzed sol to be introduced into a side portion of the blanket wound on the winding rod 110, and accordingly, the side portion of the blanket can be stably gelled.

Therefore, the bobbin 100 includes the winding rod 110 and the support plate 120, and accordingly, can wind the blanket in a roll form.

Main Body

The main body 200 is where a gelation tank 210 which receives a bobbin 100 is installed, and includes the gelation tank 210 and a first installation member 220 in which the gelation tank 210 is installed.

The gelation tank 210 is for gelling a blanket received in a bobbin 100, and includes a gelation chamber provided thereinside and receiving the bobbin 100, an outlet 212 provided at an outer lower end thereof and connected to the gelation chamber, and an inlet 213 provided at an outer upper end thereof and connected to the gelation chamber.

Particularly, the upper portion of the gelation chamber of the gelation tank 210 is opened by a cover 214, and the lower portion thereof has a 'U'-shaped cross-sectional shape having curvature corresponding to a blanket wound on the winding rod 110. Accordingly, when a silica sol is introduced into the gelation chamber, the contact force between the silica sol and the blanket can be increased, and as a result, the gelation of the blanket can be increased.

Meanwhile, the gelation tank 210 includes a rotation member 215 provided on both walls of the gelation chamber and coupled to both ends of the bobbin 100 to allow the bobbin 100 to rotate in the gelation chamber.

The rotation member 215 is rotatably installed in through-holes formed on both walls of the gelation chamber, and an end of the bobbin 100 received in the gelation chamber is installed so as to be able to transmit power.

As an example, on one surface of the rotation member 215, a coupling protrusion in a straight line shape is formed, and at the end of the bobbin 100, a coupling groove in a straight line shape to which the coupling protrusion is coupled is formed. That is, through the coupling of the coupling protrusion and the coupling groove, the bobbin 100 can be rotated in the same direction when the rotation member 215 is rotated. As a result, the bobbin 100 can be rotatably installed inside the gelation tank 210.

Meanwhile, the main body 200 further includes a second installation member 230 in which a catalyzed sol supplying member 400 is installed. The second installation member includes a bottom piece 231, an installation stand 232 installed at an upper portion of the bottom piece 231 and installed such that the catalyzed sol supplying member 400 is positioned higher than the gelation tank 210, and a staircase 233 installed at one end of the bottom piece 231.

Meanwhile, the gelation tank 210 includes a rotation handle 216 which rotates the bobbin 100 while being coupled to the other rotation member 215 provided in the gelation tank 210, and the rotation handle 216 can manually rotate the bobbin 100 from the outside.

Meanwhile, on the installation stand 232 of the second installation member 230, an aging member, a surface modification member, and a drying member are further installed.

Driving Member

The driving member 300 is for rotating the bobbin 100 received in the gelation tank 210, and is power transmittably connected to the other rotation member 215 provided in the gelation tank 210. That is, when the driving member 300 rotates the rotation member 215, it can rotate the bobbin 100 received in the gelation tank 210 by being interlocked with the rotating member.

Catalyzed Sol Supplying Member

The catalyzed sol supplying member 400 is for gelling a blanket by injecting a silica sol into a gelation tank 210 to impregnate the blanket wound on a bobbin 100, and is installed at the installation stand. The catalyzed sol supplying member 400 supplies a catalyzed sol to a gelation chamber through an inlet 213 of the gelation tank 210.

Aging Member

The aging member is for aging a blanket wound on a bobbin 100 by injecting an aging solution to a gelation tank 210, and is installed at the installation stand. The aging member supplies an aging solution to a gelation chamber through an inlet 213 of the gelation tank 210.

Surface Modification Member

The surface modification member is for surface-modifying the surface of a blanket wound on a bobbin 100 by injecting a surface modifier to a gelation tank 210, and is installed at the installation stand. The surface modification member supplies a surface modifier to a gelation chamber through an inlet 213 of the gelation tank 210.

Drying Member

The drying member is for drying a blanket wound on a bobbin 100 by supplying hot air of a high temperature to a gelation tank 210, and is installed at the installation stand. The drying member dries a blanket received in the gelation tank 210 by increasing the temperature of the gelation tank 210.

Therefore, the device for manufacturing an aerogel blanket according to an embodiment of the present invention can greatly shorten the manufacturing time of an aerogel blanket, can greatly increase the productivity of an aerogel blanket, and as a result, can mass produce an aerogel blanket.

Particularly, the device for manufacturing an aerogel blanket according to an embodiment of the present invention can induce stable gelation regardless of the thickness and length of a blanket by rotating the blanket, and since a bobbin 100 is rotated, the entire blanket wound on the bobbin 100 can be uniformly gelled. Also, since only the bobbin 100 rotates without the rotation of a gelation tank 210, the shape of the gelation tank is not limited. In addition, since a gelation chamber in the gelation tank 210 is formed in a 'U'-shaped cross-sectional shape, the blanket wound on the bobbin 100 can be more effectively gelled.

In addition, according to an embodiment of the present invention, the device for manufacturing an aerogel blanket includes a bobbin 100 on which a blanket is wound, wherein the bobbin 100 can include a winding rod 110 and a support plate 120.

Here, the outer circumferential surface of the winding rod 110 can include a fixing clip into which a winding start point is inserted and fixed.

That is, the fixing clip has a pin shape having elastic restoring force, and one end thereof is fixed on the outer circumferential surface of the winding rod 110 and the other end thereof is elastically supported on the outer circumferential surface of the winding rod 110. Accordingly, when the start point of the blanket is inserted between the other end of the fixing clip and the winding rod 110, the blanket can be fixed to the starting point of the winding rod 110 by elastic force of the fixing clip, and as a result, the blanket can be simply wound on the outer circumferential surface of the winding rod 110.

3. Aerogel Blanket

The present invention provides an aerogel blanket having uniform thermal conductivity and greatly improved overall thermal insulation due to the uniform thermal conductivity formed in the blanket. At this time, the aerogel blanket is characterized by having a deviation between the highest value of the thermal conductivity in the blanket and the lowest value of the thermal conductivity therein of 5.0 mW/m·K or less, preferably 3.0 mW/m·K or less, or 1.3 mW/m·K or less. At this time, it is also included in the scope of the present invention to have a value of 0 since there is no deviation, that is, to have the same thermal conductivity in the blanket. It can be 0.001 mW/m·K or greater, 0.05 mW/m·K or greater, or 0.1 mW/m·K or greater.

The deviation of thermal conductivity is a feature which can appear in any aerogel blanket arbitrarily cut. Specifically, it can be a deviation between the highest value of thermal conductivity and the lowest value of thermal conductivity measured in an area of 0.01 $m^2$ to 10.0 $m^2$, more specifically an area of 0.36 $m^2$ to 5.0 $m^2$.

As an example, the highest value and lowest value of the thermal conductivity of the aerogel blanket were obtained by obtaining a plurality of samples having a predetermined size in the aerogel blanket at a predetermined interval, and measuring the room temperature (23±5° C.) thermal conductivity for each sample using the HFM 436 Lambda equipment of NETZSCH Co., Ltd. Thermal conductivity values measured in the plurality of samples can have been compared to show the highest value and lowest value of thermal conductivity.

At this time, the number of samples in the aerogel blanket can vary depending on the length of the aerogel blanket, and the number thereof is not limited. As an example, it can be 2 to 20, 3 to 10, or 3 to 5.

Specifically, in the case of an aerogel blanket roll having a length of 3.5 m, 5 samples each having a size of 30 cm×30 cm can be obtained at a predetermined interval of 50 cm from the innermost side to the outermost side of the aerogel blanket roll to measure the thermal conductivity for each sample. At this time, the thermal conductivity can be measured by a method to be described later.

In addition, according to an embodiment of the present invention, the aerogel blanket includes an aerogel and a substrate for a blanket, and specifically, the aerogel can be formed inside and on the surface of the substrate for a blanket. As an example, aerogel particles in a large amount can be evenly formed inside and on the surface of the substrate for a blanket, and the aerogel blanket can have an improved thermal conductivity of 10 to 20 mW/m·K.

The thermal conductivity is a value measured at room temperature (23±5° C.) in accordance with a heat flow method using the HFM 436 Lambda equipment of NETZSCH Co., Ltd.

Accordingly, the aerogel blanket of the present invention can be usefully used as a thermal insulation material, a lagging material, or a non-combustible material for aircrafts, ships, automobiles, building structures, and the like, as well as for plant facilities for insulating and cooling, such as piping and industrial furnaces of various industrial facilities.

EXAMPLES

Hereinafter, Examples of the present invention will be described in detail so that those skilled in the art can easily carry out the present invention. However, the present invention can be embodied in many different forms, and is not limited to Examples set forth herein.

Preparation Examples: Preparation of Silica Sol and Catalyst Solution

Tetraethyl orthosilicate (TEOS) and water were mixed in a molar ratio of 1:4 and ethanol having a weight ratio of 1:5 with TEOS was added thereto to prepare a silica sol. In order to facilitate hydrolysis, hydrochloric acid was added to allow the pH of the silica sol to be 3 or less. Based on 100 parts by weight of a silica sol, 0.2 parts by weight of an opacifying agent $TiO_2$ and 0.2 parts by weight of a flame retardant Ultracarb (LKAB Co., Ltd) were mixed and then stirred for 30 minutes to prepare a silica sol, and 1 vol % of an ammonia ethanol solution (a base catalyst solution) was prepared separately therefrom. The silica sol and the base catalyst solution were mixed in a volume ratio of 9:1 to prepare a catalyzed sol.

Example 1

A bobbin on which a 10 T (10 mm) glass fiber was wound was fixed to a reaction vessel. The catalyzed sol prepared in Preparation Example above was introduced into the reaction vessel, and the bobbin on which the glass fiber was wound was rotated to perform gelation. At this time, the introduction rate of the catalyzed sol was controlled to introduce all of the catalyzed sol before the gelation was completed. When the fiber was sufficiently impregnated so that the liquid level in the reaction vessel no longer changed, a drain valve coupled to the reaction vessel was opened to recover remaining sol. 30 minutes later, when the gelation was completed, an aging solution was introduced into the reaction vessel to perform aging while rotating the bobbin. At this time, the aging solution was 5 vol % of an ammonia ethanol dilution solution, and the aging was performed at a temperature of 70° C. for 100 minutes. When the aging was completed, the drain valve was opened to recover the aging solution. Thereafter, a surface modification solution was introduced into the reaction vessel to perform surface modification while rotating the bobbin, and when completed, the surface modification solution was recovered. At this time, the surface modification solution was 10 vol % of a hexamethyldisilazane (HMDS) ethanol dilution solution, and an amount thereof having the same volume ratio as the wet gel-blanket composite was added. The surface modification (hydrophobization) was performed at room temperature for 8 hours. After the surface modification reaction was completed, a wet gel blanket was placed in a supercritical extractor and then $CO_2$ was injected thereto. Thereafter, the temperature inside the extractor was raised to 60° C. over the course of 1 hour, and supercritical drying was performed at 60° C. and 100 bar. A hydrophobic silica aerogel blanket supercritically dried was subjected to atmospheric drying in an oven at 200° C. for 2 hours to completely remove remaining salts and water, thereby manufacturing a hydrophobic silica aerogel blanket.

Examples 2 to 4

A hydrophobic silica aerogel blanket was manufactured in the same manner as in Example 1 except that the thickness and/or type of the fiber were changed according to the conditions listed in Table 1 below.

Example 5

A hydrophobic silica aerogel blanket was manufactured in the same manner as in Example 1 except that the aging and the surface modification were performed without rotating the bobbin.

Example 6

A hydrophobic silica aerogel blanket was manufactured in the same manner as in Example 3 except that the aging and the surface modification were performed without rotating the bobbin.

Comparative Example 1

A hydrophobic silica aerogel blanket was manufactured in the same manner as in Example 1 except that the bobbin was not rotated.

Comparative Example 2

A hydrophobic silica aerogel blanket was manufactured in the same manner as in Example 2 except that the bobbin was not rotated.

Comparative Example 3

A hydrophobic silica aerogel blanket was manufactured in the same manner as in Example 3 except that the bobbin was not rotated.

Comparative Example 4

A hydrophobic silica aerogel blanket was manufactured in the same manner as in Example 4 except that the bobbin was not rotated.

EXPERIMENTAL EXAMPLES

1) Measurement of Room Temperature Thermal Conductivity (mW/m·K)

5 samples each having a size of 30 cm×30 cm were prepared for each blanket in the aerogel blanket manufactured in each of Examples and Comparative Examples. The room temperature (23±5° C.) thermal conductivity was measured for each sample using the HFM 436 Lambda equipment of NETZSCH Co., Ltd. At this time, 5 samples were obtained by cutting at a predetermined interval of 50 cm from the innermost side to the outermost side of an aerogel blanket roll manufactured in each of Examples and Comparative Examples. The thermal conductivity of each of the 5 samples was measured, and then the measured values were compared to show the highest value and the lowest value.

2) Measurement of Moisture Impregnation Rate (Wt %)

The moisture impregnation rate of the silica aerogel blanket manufactured in each of Examples and Comparative Examples was measured.

Specifically, a specimen having a size of 25.4 cm×25.4 cm was floated on distilled water of 21±2° C. and a 6.4 mm mesh screen was placed on the specimen to sink the specimen to 127 mm below the surface of the water. 15 minutes later, the screen was removed, and when the specimen rose to the surface, the specimen was picked up with a clamp and was hung vertically for 60±5 seconds. Thereafter, the weight before and after the impregnation were each measured to confirm a weight increase rate, and the weight increase rate was represented as a moisture impregnation rate.

The lower the moisture impregnation rate, the higher the degree of hydrophobicity of the aerogel blanket.

TABLE 1

| | Fiber type | Fiber Thickness (mm) | Moisture impregnation rate (wt %) | Thermal conductivity lowest value (mW/m · K) | Thermal conductivity highest value (mW/m · K) |
|---|---|---|---|---|---|
| Example 1 | Glass fiber | 10 | 2.3 | 17.5 | 18.6 |
| Example 2 | Glass fiber | 0.3 | 1.1 | 12.8 | 13.5 |
| Example 3 | PET fiber | 8 | 2.0 | 16.5 | 17.7 |
| Example 4 | PET fiber | 0.5 | 1.2 | 13.3 | 13.9 |
| Example 5 | Glass fiber | 10 | 4.5 | 18.1 | 19.0 |
| Example 6 | PET fiber | 8 | 3.9 | 17.0 | 18.3 |
| Comparative Example 1 | Glass fiber | 10 | 300 | 17.8 | 28.5 |
| Comparative Example 2 | Glass fiber | 0.3 | 254 | 13.1 | 26.7 |
| Comparative Example 3 | PET fiber | 8 | 185 | 16.6 | 30.1 |
| Comparative Example 4 | PET fiber | 0.5 | 171 | 13.5 | 28.9 |

As shown in Table 1, it can be confirmed that Examples 1 to 6 in which the gelation was performed while rotating the bobbin on which the substrate for a blanket was wound has a significantly low moisture impregnation rate value compared to Comparative Examples 1 to 4 in which the gelation was performed without rotating the substrate for a blanket, and has a very small deviation between the lowest thermal conductivity value and the highest thermal conductivity value, from which it can be confirmed that an aerogel was uniformly formed in the blanket substrate.

In addition, it can be confirmed that among Examples, Examples 1 to 4 in which the aging and the surface modification were also performed while rotating the bobbin on which the wet-gel blanket was wound has an even lower moisture impregnation rate value.

As described above, when gelation is performed while rotating a substrate for a blanket into which a catalyzed sol is impregnated during a gelation process of an aerogel blanket, an aerogel is uniformly formed in the blanket, so that excellent thermal conductivity can be achieved. Also, the physical properties of the aerogel blanket do not greatly vary by position therein, so that quality can be improved and hydrophobicity can be greatly improved.

The foregoing description of the present invention has been presented for purposes of illustration. It will be understood by those skilled in the art that various changes in form and details can be made therein without departing from the spirit and scope of the invention. It is therefore to be understood that the above-described embodiments are illustrative in all aspects and not restrictive.

LIST OF REFERENCE NUMERALS

100 Bobbin
110 Winding rod
120 Support plate
200 Main body
210 Gelation tank
212 Outlet
213 Inlet
214 Cover
215 Rotation member
216 Rotation handle
220 First installation member
230 Second installation member
231 Bottom piece
232 Installation stand
233 Staircase
300 Driving member
400 Catalyzed sol supplying member

The invention claimed is:

1. An aerogel blanket, comprising:
a substrate for a blanket; and
an aerogel, and the aerogel is formed inside and on the surface of the substrate, the aerogel blanket having a deviation between the highest value of the thermal conductivity of the aerogel blanket and the lowest value of the thermal conductivity thereof of 5.0 mW/m·K or less, and having a moisture impregnation rate of 1.1 wt % to 4.5 wt %.

2. The aerogel blanket of claim 1, wherein the aerogel has a modified surface comprising a hydrophobic functional group that renders the surface hydrophobic.

3. The aerogel blanket of claim 2, wherein the hydrophobic functional group is from an organosilane compound.

4. The aerogel blanket of claim 3, wherein the organosilane compound is selected from the group consisting of trimethylchlorosilane (TMCS), hexamethyldisilazane (HMDS), trimethylethoxysilane, ethyltriethoxysilane, and phenyltriethoxysilane.

* * * * *